United States Patent [19]

Murdoch

[11] 3,990,751

[45] Nov. 9, 1976

[54] DRILL BIT

[75] Inventor: Henry W. Murdoch, Houston, Tex.

[73] Assignee: Reed Tool Company, Houston, Tex.

[22] Filed: Aug. 13, 1975

[21] Appl. No.: 604,264

[52] U.S. Cl. .............................. 308/8.2; 308/241; 308/DIG. 8
[51] Int. Cl.² ...................................... F16C 19/00
[58] Field of Search ............... 308/8.2, 237 R, 240, 308/DIG. 8, 241, DIG. 9

[56] References Cited
UNITED STATES PATENTS

| | | | |
|---|---|---|---|
| 3,150,901 | 9/1964 | Esten et al. ................... | 308/DIG. 8 |
| 3,721,307 | 3/1973 | Mayo .............................. | 308/8.2 X |
| 3,845,994 | 11/1974 | Trey ................................ | 308/8.2 |
| 3,913,988 | 10/1975 | Scales et al. ................... | 308/8.2 |
| 3,923,348 | 12/1975 | Peck ............................... | 308/8.2 |

*Primary Examiner*—M. H. Wood, Jr.
*Assistant Examiner*—Gene A. Church
*Attorney, Agent, or Firm*—Joe Edwards; Jack Springgate; Neal Mosely

[57] ABSTRACT

A roller cutter drill bit with a body having a journal, a roller cutter, bearing means for rotatively mounting the roller cutter on the journal and a part of said bearing means including a maraging steel sleeve with a lubricant between the sleeve and the journal and between the sleeve and the roller cutter to prevent galling.

7 Claims, 1 Drawing Figure

U.S. Patent  Nov. 9, 1976  3,990,751
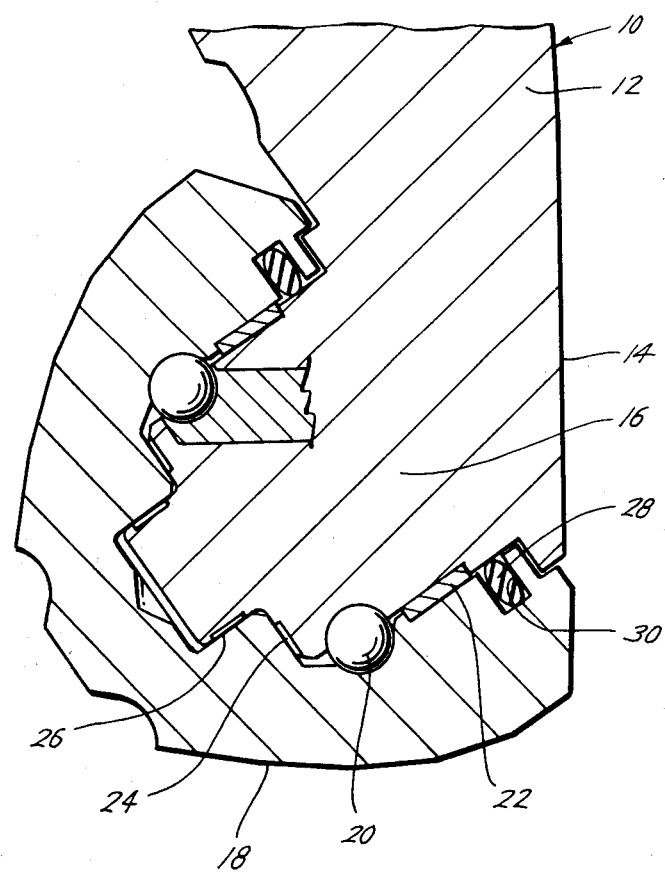

DRILL BIT

BACKGROUND OF THE INVENTION

The drilling industry has devoted considerable effort to the improvement of bearings for roller cutter drill bits. To have a sufficiently long drilling life to be commercially useful, the bearing should have a minimum of friction and wear. Recently materials called maraging steels have been developed which have unique properties which make them candidates as bearing materials. Such materials have a chemistry which allows them to be thermally processed without a carbon controlled atmosphere. These maraging steels have minimal size change as a result of heat treating to full hardness. These steels have tensile strengths in the range from 150,000 psi to 400,000 psi with greater toughness than other steels and can achieve a hardness of Rockwell C 55. One disadvantage of using such maraging steels as a bearing member is that they tend to gall.

SUMMARY

The present invention provides an improved roller cutter drill bit bearing of a maraging steel having sufficient lubricity that the galling tendency is overcome.

An object of the present invention is to provide an improved roller cutter drill bit having a bearing means with long life.

A further object is to provide an improved roller cutter drill bit having a bearing of maraging steel which is not subject to galling.

BRIEF DESCRIPTION OF THE DRAWING

The FIGURE is a sectional view of a portion of a drill bit embodying the improved structure of the present invention.

DESCRIPTION OF THE PREFERRED EMBODIMENTS

The drill bit 10 shown in the FIGURE includes the body 12 having at least one leg 14 extending therefrom. The leg 14 terminates in the journal 16 about which the roller cutter 18 is rotatively mounted by suitable bearing means. The bearing means includes the ball bearings 20, the sleeve bearing 22 and the bearing surfaces 24 and 26. The seal 28 is positioned in the groove 30 in roller cutter 18. The seal 28 functions as the outer seal for the lubrication system (not shown) which supplies lubricant to the bearings.

Sleeve bearing 22 is of a floating sleeve type of bearing. The sleeve bearing 22 is made of a maraging steel which has been heat treated to have a maximum of hardness which is preferred to be approximately Rockwell C 50 to C 55. The desired lubricity is supplied to the maraging steel sleeve bearing 22 by assuring that a lubricating material is positioned between sleeve bearing 22 and the surfaces against which it has moving contact.

The lubricant supplied to sleeve bearing 22 is selected from the group consisting of silver, copper and polytetrafluoroethylene. The silver is the preferred lubricant and is provided by plating silver on the bearing sleeve 22 to a reasonable thickness, such as one mil. The lubricant may also be supplied by having particles thereof suspended in the grease which is loaded into the lubrication system. In this manner, the particles are initially all around the bearing sleeve 22 and during operation the particles provide the lubricity which avoids the galling problems encountered with maraging steels. It is suggested that the lubricant be supplied both by plating and by suspension of particles in the grease of the bit lubrication system. Further, it is contemplated that the sleeve could be plated with silver and the grease include copper or polytetrafluaroethylene particles to provide the desired lubricity.

The advantages of using a maraging steel for the bearing sleeve are that the sleeve does not extrude under heavy loads and the sleeve functions better as a bearing because it has a greater hardness and toughness. Further, since the maraging steel is heat treated to obtain its hardness to a temperature such as 900° F, it has a greater resistance to the high temperatures encountered in air drilling. With the sleeve lubricant, the maraging steel sleeve bearing is not subject to galling.

From the foregoing it can be seen that the present invention provides an improved drill bit with a sleeve bearing having greater toughness, hardness and temperature resistance than prior sleeve bearings and is not subject to galling.

What is claimed is:
1. A drill bit, comprising
   a body having a journal extending therefrom
   a roller cutter, and
   bearing means for rotatively mounting said roller cutter on said journal,
   at least part of said bearing means including
   a heat-treated, maraging steel sleeve, having a Rockwell C hardness of at least 50, positioned around said journal within said roller cutter, and
   a metal coating on said sleeve having lubricating properties positioned between said sleeve and said journal and between said sleeve and said roller cutter,
   said metal coating imparting sufficient lubricity to said sleeve to prevent galling of said roller cutter and said journal.
2. A drill bit according to claim 1 wherein said metal coating is silver.
3. A drill bit according to claim 1
   wherein there is provided supplemental lubricating material selected from the group consisting of silver, copper and polytetrafluoroethylene.
4. A drill bit according to claim 2 wherein said silver is plated on said sleeve.
5. A drill bit according to claim 1, including
   a lubrication system within said body and in communication with said bearing means,
   a lubricant grease having particles selected from the group consisting of silver, copper and polytetrafluoroethylene dispersed therein,
   said lubricant grease being added to said lubrication system whereby the grease and particles are delivered to the areas of contact on said sleeve with said journal and said roller cutter.
6. A drill bit according to claim 5 wherein said metal coating is silver plated on said sleeve.
7. A drill bit according to claim 3 wherein said supplemental lubricating material is a lubricant grease having particles selected from the group consisting of silver, copper and tetrafluoroethylene dispersed therein, and
   said grease is supplied to the area between said sleeve and said journal and between said sleeve and said roller cutter.

* * * * *